(12) United States Patent
Fort (10) Patent No.: US 6,292,613 B1
(45) Date of Patent: Sep. 18, 2001

(54) FIBER COATED WITH A CROSSLINKED EPOXIDIZED-POLYDIENE OLIGOMER

(75) Inventor: François Fort, Paris (FR)

(73) Assignee: Fort Fibres Optiques Recherche et Technologie, Dourdan (FR)

(*) Notice: Subject to any disclaimer, the term of this patent is extended or adjusted under 35 U.S.C. 154(b) by 0 days.

(21) Appl. No.: 09/330,142

(22) Filed: Jun. 11, 1999

(30) Foreign Application Priority Data

Jun. 17, 1998 (FR) .................................................. 98 07631

(51) Int. Cl.$^7$ ........................................................ G02B 6/02
(52) U.S. Cl. ............................................. 385/128; 521/128
(58) Field of Search .............................. 385/122, 124, 385/128, 126, 129, 146, 147; 65/377, 419, 420, 382, 379, 385; 521/128, 129, 332.9, 333.3

(56) References Cited

U.S. PATENT DOCUMENTS

| H1734 | * | 6/1998 | Masse | 521/128 |
|---|---|---|---|---|
| 3,951,815 | * | 4/1976 | Wrasidlo | 210/500 |
| 4,932,990 | * | 6/1990 | Michie et al. | 65/3.12 |
| 5,905,838 | * | 5/1999 | Judy et al. | 385/123 |
| 5,932,656 | * | 8/1999 | Masse | 525/92 B |
| 5,993,965 | * | 11/1999 | Flat | 428/375 |
| 6,105,396 | * | 8/2000 | Glodis et al. | 65/377 |

FOREIGN PATENT DOCUMENTS 0 859 038   8/1998  (FR) .

OTHER PUBLICATIONS

"Primary coating materials of optical fiber" by Kimura et al, Chemical Abstract, vol. 22. No. 91, 1978 Abstract No. 91: 176723.*

"Epoxidized Polybutadiene: A novel prepolymer for cationally UV–curable coatings" Journal of Coating Technology, vol. 66, No. 838, Nov. 1994, pp. 27–34.*

Kimura, T et al., "Primary coating materials of optical fiber," *Chemical Abstracts*, vol. 22, No. 91, 1978, Abstract No. 91:176723.

Cazaux, F. et al., "Epoxidized polybutadiene: a novel prepolymer for cationically UV–curable coatings"; *Journal of Coatings Technology*, Vol. 66, No. 838, Nov. 1994, pp. 27–34.

* cited by examiner

*Primary Examiner*—Akm E. Ullah
(74) *Attorney, Agent, or Firm*—Morgan, Lewis & Bockius LLP (57) ABSTRACT

A fiber, especially an optical fiber, comprising a lightguide, provided with a protective coating comprising at least one layer of a crosslinked epoxidized-polydiene oligomer, as well as to a process for manufacturing such a fiber. The protective coating may include an intermediate layer of a crosslinked material that adheres to the fiber less strongly than the crosslinked epoxidized-polydiene oligomer.

21 Claims, 5 Drawing Sheets

FIBER COATED WITH A CROSSLINKED EPOXIDIZED-POLYDIENE OLIGOMER

FIELD OF THE INVENTION

The present invention relates to fibres provided with a hydrophobic protective coating, to a cable comprising at least one such fibre surrounded by a protective sheath and to a process for producing these fibres.

The invention also relates to optical fibres provided with a hydrophobic protective coating as well as to a process for producing a fibre-optic interconnection device.

BACKGROUND OF THE INVENTION

Optical fibres comprise a lightguide which, as its name suggests, has the purpose of conducting light waves.

When this lightguide is made of silica, it is fundamental to protect this silica from being attacked by the chemicals normally or accidentally present in the external environment. In particular, moisture (or more precisely, OH⁻ ions) embrittles the silica or quartz of the optical fibres by penetrating the micropores inherent in its crystalline structure, thus degrading the optical properties of the lightguide. The chemical attack on the silica, accelerated by the mechanical (bending, tensile, etc.) stresses to which the optical fibre is subjected, over time produces fracture initiators on the lightguide.

Various protective coatings have been proposed so as to remedy these drawbacks. Thus, it is known to provide silica optical fibres with a coating made of an epoxy acrylate resin. This coating is applied immediately after drawing the optical fibre, or even simultaneously therewith. It prevents the drawn quartz from oxidizing, blocks the micropores present in the fibre and increases the mechanical strength of the fibre.

However, the epoxy acrylate has the drawback of being permeable to OH⁻ ions, and is therefore water-soluble, and to moisture, which results in the destruction or blistering of the epoxy acrylate protecting the fibre, the protection against the external environment then losing its effectiveness over time.

Consequently, the optical fibre coated with an epoxy acrylate is normally placed in microtubes internally coated with a petroleum jelly so as to protect it from the undesirable effects of moisture.

However, such a structure has an extremely poor mechanical strength because of the presence of the protective microtube, which is moreover subject to folding and has an elasticity which lends itself poorly to effective protection of the fibre.

Furthermore, the protective system consisting of the microtube internally coated with petroleum jelly does not allow a very high fibre density (namely, a large number of fibres per cable) to be obtained, because of the diameter of the microtube which it is necessary to adopt in order to allow the jelly to be deposited. By way of example, it is enough to point out that, for an optical fibre only 250 $\mu$m in diameter, the tubes have a diameter of 1.5 to 2.5 mm.

It has also been proposed to coat the optical fibre with a film of UV-crosslinkable silicone, as described in Patent FR 2,628,847. However, silicones have a strong affinity for water. It is therefore necessary to provide an external sheath made of a rigid plastic, for example polyetherimide. This external sheath has the drawback of increasing the diameter of the fibre up to 1 mm, a diameter which, once again, does not allow a very high fibre density to be obtained in cables.

In addition, since silicones are pollutants, they have to be recycled after the fibres have been used.

A drawback common to all these solutions of the prior art is the incompatibility between the quartz of the optical fibre and the coating used for protecting the latter, resulting in insufficient adhesion of the protective coating, which is applied in a loose manner to the optical fibre.

SUMMARY OF THE INVENTION

The object of the present invention is therefore to provide for a fibre, especially an optical fibre, and for a cable comprising at least one such fibre which better meet the practical requirements than the previously known fibres of the same type, while having a low manufacturing cost, especially in that the fibre according to the invention includes a coating which:

exhibits improved chemical resistance to the external medium, especially to water and moisture, has an improved mechanical strength, for a given diameter, and is chemically compatible with the core of the fibre, especially with quartz, while interacting with the latter so that there is effective interaction with the quartz.

The subject of the present invention is a fibre provided with a protective coating, wherein the said protective coating comprises at least one layer of a crosslinked epoxidized-polydiene oligomer.

DESCRIPTION OF THE INVENTION

Mention may be made, by way of non-limiting examples, of textiles (polyester, polyamide or polyurethane) fibres, metal (steel, copper or aluminium) fibres and glass fibres (which can be used, for example, as reinforcement for various materials, whatever their fields of application). Any flexible elongate body whatsoever, provided with the above-mentioned protective coating, is also included with in the context of the present invention.

Advantageously, the thickness of the said layer of a crosslinked epoxidized-polydiene oligomer is between 20 and 60 $\mu$m, preferably between 20 and 40 $\mu$m.

The epoxidized-polydiene oligomer is such as the one described in Patent Application EP 0,859,038. Thus, the epoxidized-polydiene oligomer has, for example, a number-average molecular mass $M_n$ of between 500 and 10,000 g/mol, preferably between 1000 and 5000 g/mol.

The diene, which is the base monomer of the polydiene, is a conjugated diene which may be selected from the group comprising butadiene, isoprene, chloroprene, 1,3-pentadiene and cyclopentadiene.

The epoxidized-polydiene oligomer may be functionalized at the ends of the chain by hydroxyl or epoxy functional groups, this functionalization allowing the number of reactive functional groups to be increased during crosslinking.

The epoxidized-polydiene oligomer may also be partially hydrogenated.

The epoxidized-polydiene oligomer is, for example, a hydroxytelechelic polybutadiene, i.e. a polybutadiene functionalized at the ends of the chain by hydroxyl functional groups, comprising at most 25%, preferably about 1 to 8%, of epoxy functional groups on the chain and comprising, after epoxidation, 70 to 80%, preferably 75%, of 1,4 units.

The viscosity of the epoxidized-polydiene oligomer is, for example, less than 100 Pa.s at 30° C., preferably less than 40 Pa.s at 30° C.

Mention may be made especially of PolyBd 600/605 materials from Elf Atochem, PolyBd R 45 EPI from Idemitsu Petrochemical and Kraton Liquid Polymer EKP 206 and 207 materials from Shell.

The epoxidized-polydiene oligomer may also comprise vinyl and/or acrylic comonomers, such as styrene and acrylonitrile.

Additives, such as reactive diluents, wetting agents, degassing agents, antioxidants, UV stabilizers, spreading agents, rheological agents, solvents, plasticizers and colorants, may be added to the epoxidized-polydiene oligomer.

The term <<reactive diluent>> should be understood to mean a composition formed by small liquid molecules, of low viscosity (between $5\times10^{-3}$ and $40\times10^{-3}$ Pa.s at 25° C.), having a low vapour pressure, a high flash point and a high boiling point, the role of which is to reduce the viscosity of the epoxidized-polydiene oligomers. The reactive diluent may furthermore increase the weight content of reactive functional groups of the epoxidized-polydiene oligomer.

In addition, the term <<wetting agent>> should be understood to mean chemical substance capable of lowering the surface and interfacial tensions of a liquid medium, thus resulting in an increase in the dispersion of the liquid over a defined surface.

The reactive diluent may be a difunctional cycloaliphatic epoxy (sold, for example, by 3M under the reference CYRACURE UVR 6110) or a vinyl ether (for example 1,4-butanediol monovinyl ether), while the wetting agent may, for example, be a fluorinated surfactant such as FLUORAD sold by Borlöcher.

According to a preferred embodiment of the fibre according to the invention, the said fibre is a plastic optical fibre or a silica optical fibre comprising a lightguide, the said lightguide being advantageously made of silica doped with germanium.

Among the various types of optical fibres that can be used, mention may be made of monomode fibres and multimode fibres. The optical fibres according to the invention may be intended for various applications, such as light transmission for illumination of inaccessible places and/or data transmission (analog and/or digital, telecommunication and computing data transmission).

The coating described above is both adherent and mechanically strong, while still retaining the flexibility required for subsequent uses of the fibre, and does not have a pronounced smell.

If the fibre according to the invention is a silica optical fibre, the protective coating comprising at least one layer of a crosslinked epoxidized-polydiene oligomer, as described above, adheres particularly well to the lightguide. The extremely good adhesion of the crosslinked epoxidized-polydiene oligomer provides perfect sealing of the optical fibre, to such a point that the lightguide can, if necessary, especially for the purpose of inserting it into a connector of suitable diameter, be stripped only by etching it.

The optical fibre with the protective coating according to the invention is actually significantly better sealed with respect to water and to moisture. Compared with a silicone coating for example, the improvement in sealing is 50%.

According to an advantageous embodiment of the fibre according to the invention, the said protective coating comprises, placed between the said fibre and the said layer of a crosslinked epoxidized-polydiene oligomer, at least one layer made of a crosslinked material which adheres to the fibre less strongly than the said crosslinked epoxidized-polydiene oligomer adheres to the fibre and which is compatible with the said crosslinked epoxidized-polydiene oligomer.

In the context of the present invention, the term <<compatible>> should be understood to mean chemical compatibility between the two aforementioned layers. Preferably, this compatibility results from interpenetration of the two materials by the macromolecular chains of the two layers migrating towards each other.

As a variant, the intermediate layer placed between the fibre and the layer of a crosslinked epoxidized-polydiene oligomer is only present on the fibre locally, at places likely to form ends of the fibre; for example, if the said fibre is an optical fibre, these ends may be intended to be inserted into connectors.

In general, any material making it possible to protect the fibre (for example, to protect an optical fibre while it is being drawn) and to allow it to be stripped can be used as the intermediate layer, as defined above. In the case of an optical fibre, the presence of the intermediate layer as defined above, apart from the fact that it protects the fibre while it is being drawn and makes it easier for it to be stripped, allows the optical losses of the fibre to be limited.

Advantageously, the layer deposited between the fibre and the layer of a crosslinked epoxidized-polydiene oligomer is a UV-crosslinked material selected from the group consisting of an epoxy acrylate and a semi-adherent polydiene oligomer. Advantageously, its thickness is between 10 and 100 μm, preferably between 20 and 60 μm.

In the context of the present invention, a polydiene oligomer is termed <<semi-adherent>> when its adhesion to the fibre is less than the adhesion to the fibre of the crosslinked epoxidized-polydiene oligomer forming the radially external layer of the protective coating of the said fibre. Thus, the semi-adherent polydiene oligomer allows the fibre to be stripped, simply by mechanically ablating the protective coating.

According to another preferred embodiment of the fibre according to the invention, the said protective coating is provided with a marking produced by a colorant.

Advantageously, the said colorant is incorporated into the layer of a crosslinked epoxidized-polydiene oligomer as defined above.

As a variant, the said marking produced by a colorant is achieved by the presence of a colorant layer immediately adjacent to the said layer of a crosslinked epoxidized-polydiene oligomer and placed so as to be radially internal to the said layer of a crosslinked epoxidized-polydiene oligomer. Since the layer of a crosslinked epoxidized-polydiene oligomer is transparent, the presence of a colorant layer, radially internal to this layer, is visible and makes it possible to identify the fibre, by its colour, among a bundle of differently coloured fibres.

According to this variant, the said colorant layer comprises a colorant incorporated into the UV-crosslinked epoxy acrylate. Its thickness is between 3 and 10 μm.

Particularly advantageously, a fibre according to the invention is such that it comprises:
  lightguide,
  at least one radially outermost layer of a crosslinked epoxidized-polydiene oligomer,
  at least one radially innermost layer, placed over the said lightguide and made of a crosslinked material which adheres to the lightguide less strongly than the said crosslinked epoxidized-polydiene oligomer adheres to the lightguide and which is compatible with the said crosslinked epoxidized-polydiene oligomer, and a colorant layer as defined above, placed between the said layer of a crosslinked epoxidized-polydiene oligomer and the said layer made of a crosslinked material which adheres to the lightguide less strongly than the said crosslinked epoxidized-polydiene oligomer adheres to the lightguide and which is compatible with the said crosslinked epoxidized-polydiene oligomer.

The optical fibre according to the invention is sufficiently hermetically sealed and robust for it to be used without any additional external is sheathing. It may also be inserted as it is into an optical cable comprising a bundle of fibres according to the invention.

The subject of the present invention is therefore also a cable, which comprises at least one fibre as defined above, surrounded by a protective sheath.

The subject of the present invention is also a multifibre cable, which comprises at least two optical fibres coloured with at least two different colours, as defined above, surrounded by a protective sheath, each optical fibre being coloured, over its entire length, so as to allow each fibre to be identified at the ends of the said cable.

The subject of the present invention is also a process for manufacturing a fibre as defined above, which comprises at least one step of depositing a layer of an epoxidized-polydiene oligomer on a fibre, the said deposition being followed by a step of crosslinking this layer.

The crosslinking step may be carried out, for example, by UV irradiation, or else chemically or by heating, especially by means of microwaves, electromagnetic waves, or electron beams.

According to an advantageous way of implementing this process, the step of depositing a layer of an epoxidized-polydiene oligomer on the said fibre is preceded by a step of drawing the said fibre.

According to another advantageous way of implementing this process, the successive steps of drawing the fibre, of depositing a layer of an epoxidized-polydiene oligomer on the fibre and of crosslinking this layer are carried out in a continuous manner.

Preferably, the process according to the invention comprises a first step of depositing a layer of an epoxidized-polydiene oligomer on the said fibre and a second step of depositing a layer of an epoxidized-polydiene oligomer on the layer deposited previously.

In this case, each step of depositing a layer of an epoxidized-polydiene oligomer on the said fibre is advantageously followed by a step of crosslinking this layer before the next layer is deposited, in which case the sum of the energies to be provided for crosslinking each layer is less than that which would have to be provided for crosslinking a combination of the two layers, in a single go.

However, it is possible, of course, to carry out only a single crosslinking step after the two successive steps of depositing a layer of an epoxidized-polydiene oligomer on the fibre.

According to another advantageous method of implementing the process according to the invention, a composition which comprises the epoxidized-polydiene oligomer, as well as at least one photoinitiator salt and optionally a reactive diluent, is deposited on the said fibre and the crosslinking step is a cationic photopolymerization brought about by UV irradiation.

A suitable photoinitiator salt is, for example, a salt capable of producing a strong acid under UV irradiation so as to initiate the cationic polymerization of the system. In a non-limiting manner, mention may be made of triarylsulphonium hexafluorophosphates (for example, FX512 sold by 3M) and triarylsulphonium hexafluoroantimonates (for example, UVI 6974 sold by Union Carbide).

The amount of photoinitiator salt depends on the number of epoxy functional groups and on the desired rate of polymerization.

Advantageously, the amount of photoinitiator salt is at most 10 parts by weight, or preferably between 0.01 and 10 parts by weight, per 100 parts of the epoxidized-polydiene oligomer.

According to another advantageous method of implementing the process according to the invention, before a layer of an epoxidized-polydiene oligomer is deposited on the said fibre, the process comprises at least one step of depositing a coating layer comprising a material which adheres to the said fibre less strongly than the crosslinked epoxidized-polydiene oligomer does and which is compatible with the epoxidized-polydiene oligomer, which step is followed by a step of crosslinking the said material.

According to an advantageous way of implementing the said process, it comprises a first step of depositing a coating layer, comprising a material which adheres to the said fibre less strongly than the crosslinked epoxidized-polydiene oligomer does and which is compatible with the epoxidized-polydiene oligomer, on the said fibre and a second step of depositing a coating layer, comprising a material which adheres to the said fibre less strongly than the crosslinked epoxidized-polydiene oligomer does and which is compatible with the epoxidized-polydiene oligomer, on the layer deposited previously.

An advantageous method of implementing this process consists in following each step of depositing the said coating layer on the fibre with a step of crosslinking this coating, in a similar way to that described in the context of the successive steps of depositing several layers of epoxidized-polydiene oligomer on the fibre. However, it is possible, of course, to carry out only a single crosslinking step after the two successive steps of depositing a coating layer, comprising a material which adheres to the said fibre less strongly than the crosslinked epoxidized-polydiene oligomer does and which is compatible with the epoxidized-polydiene oligomer, on the fibre.

Suitable crosslinking methods are the same as those described above, i.e. UV irradiation, chemical crosslinking or crosslinking by heating (in a non-limiting manner, by means of microwaves, electromagnetic waves or electron beams). Preferably, the crosslinking step is carried out by UV irradiation of the fibre provided with its coating.

According to another advantageous method of implementing the process according to the invention, the latter furthermore comprises, before a layer of an epoxidized-polydiene oligomer is deposited, a step of depositing a colorant layer.

According to yet another advantageous method of implementing the process according to the invention, the latter comprises, after the said layer made of a crosslinked material which adheres to the fibre less strongly than the said crosslinked epoxidized-polydiene oligomer adheres to the fibre and which is compatible with the said crosslinked epoxidized-polydiene oligomer is deposited, and before the said layer of an epoxidized-polydiene oligomer is deposited, a step of depositing a colorant layer.

According to yet another advantageous method of implementing the process according to the invention, the fibre provided with at least one layer of an epoxidized-polydiene oligomer is made to pass through a source of UV radiation having a length of between 15 and 25 cm.

According to yet another advantageous method of implementing the process according to the invention, the fibre runs along at a speed of between 100 and 600 m/min during the said deposition of the various coating layers on the fibre.

According to yet another advantageous method of implementing the process according to the invention, the said fibre is an optical fibre comprising a lightguide and the said process starts with a step of drawing the said lightguide from a preform of transparent material in a drawing furnace.

The subject of the present invention is also a process for producing a fibre-optic interconnection device comprising an optical fibre provided, at least at one of its ends, with a connector and comprising a lightguide, the external diameter of which is approximately equal to the internal diameter of the connector, which comprises:

a step of manufacturing an optical fibre comprising a lightguide provided with a protective coating having at least one layer of a crosslinked epoxidized-polydiene oligomer and at least one layer, placed between the lightguide and the layer of a crosslinked epoxidized-polydiene oligomer, made of a crosslinked material which adheres to the lightguide less strongly than crosslinked epoxidized-polydiene oligomer adheres to the lightguide and which is compatible with the epoxidized-polydiene oligomer, a step of obtaining, at least at one of the ends of the optical fibre, a lightguide of external diameter approximately equal to the internal diameter of the connector by mechanically ablating the protective coating at one of the ends of the optical fibre, and a step of inserting the stripped end of the lightguide into the connector.

According to an advantageous method of implementing this process, it uses a cable according to the invention, as previously defined and it comprises the following steps:

identifying an optical fibre by its colour at a first end of the cable, inserting the fibre thus identified into a first connector, identifying the second end of the said fibre by its colour at the second end of the cable, and inserting the said second end of the said fibre into a second connector.

Apart from the above arrangements, the invention furthermore comprises other arrangements which will emerge from the rest of the description which follows, which refers to the appended drawings.

Figure 1:
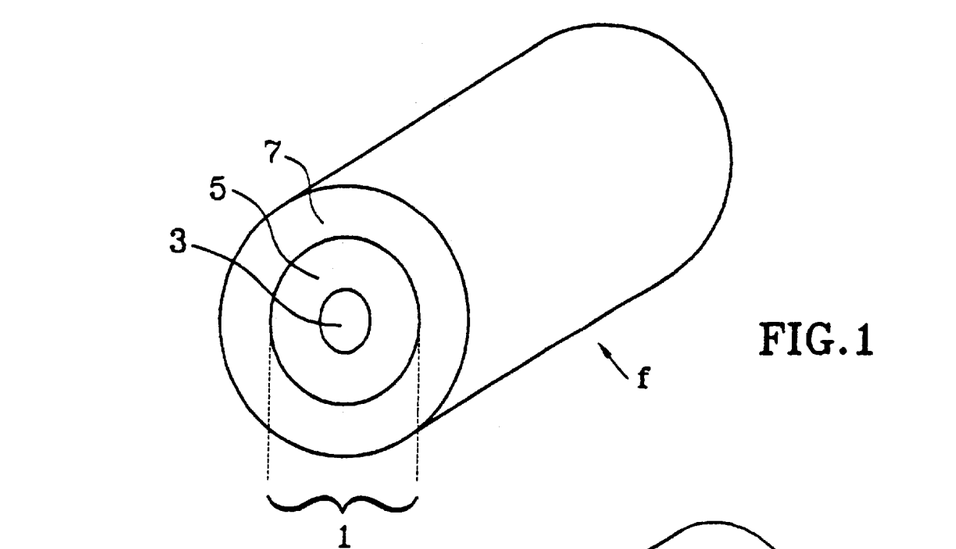
FIG. 1 is a perspective view of one end of an optical fibre according to the invention, provided with a protective coating comprising a single layer of a crosslinked epoxidized-polydiene oligomer.

FIG. 1 shows an optical fibre f which consists of a lightguide 1 provided with a protective coating 7. Conventionally, the lightguide 1 consists of a doped-silica core 3 and a silica cladding 5.

In FIG. 1, the protective coating 7 of the lightguide 1 comprises a single layer, made of an epoxidized-polydiene oligomer, the said layer being crosslinked by a suitable means, as indicated above.

Figure 2:
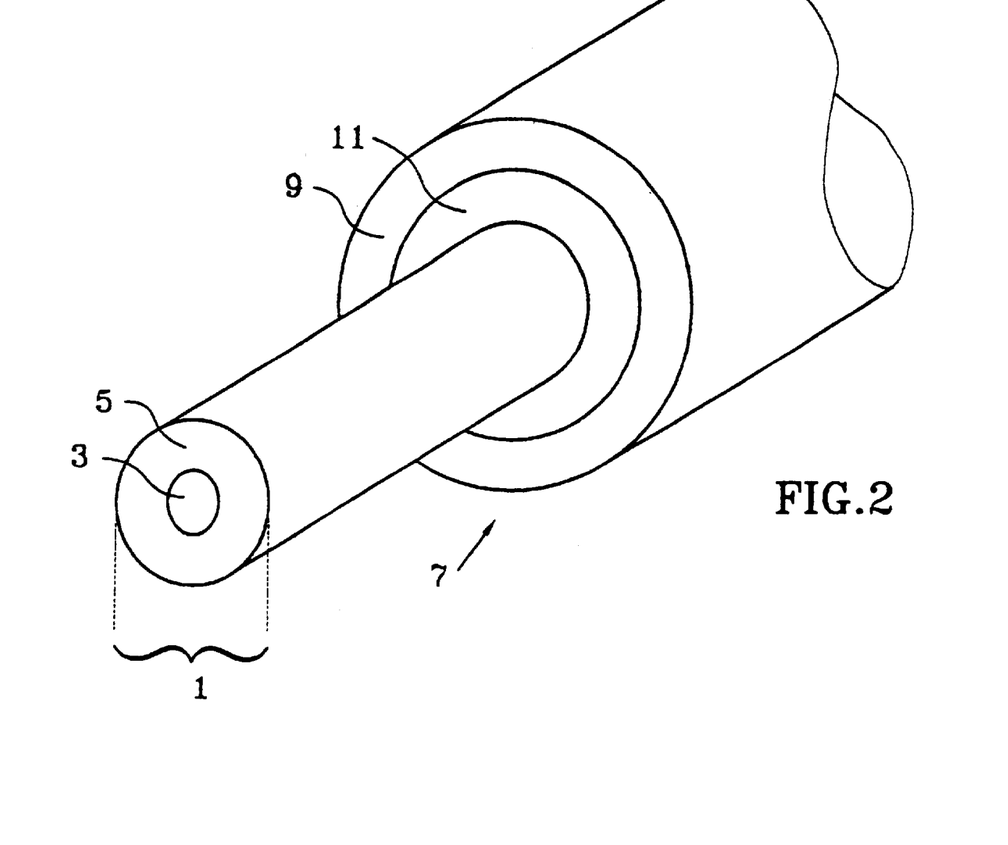
FIG. 2 is a perspective view of a partially stripped end of an optical fibre according to the invention, provided with a protective coating comprising two layers.
Figure 3:
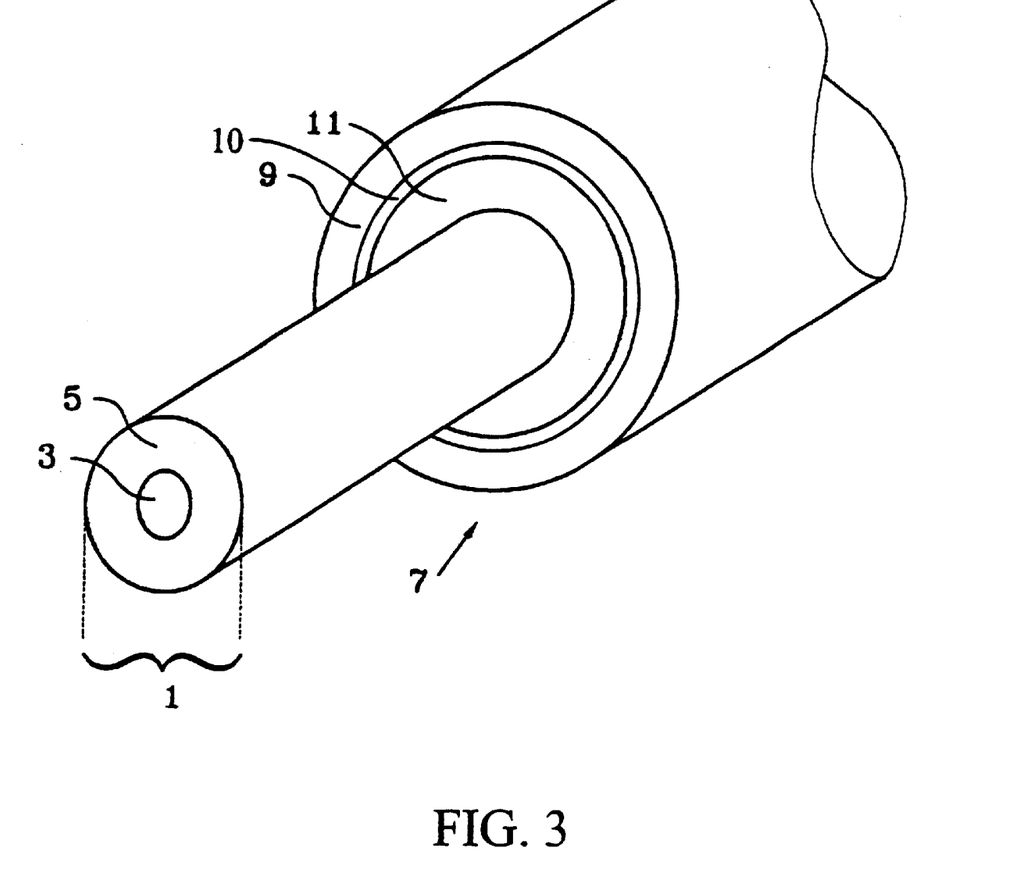
FIG. 3 is a perspective view of a partially stripped end of an optical fibre according to the invention, provided with a protective coating comprising three layers.

FIGS. 2 and 3 show other embodiments of an optical fibre according to the present invention. The lightguide 1 consists of a doped-silica core 3 and of a silica cladding 5. Its external diameter corresponds to a standardized diameter, for example 125 $\mu$m. This lightguide 1 comprises a protective coating 7 consisting of:

in the case of FIG. 2, a first layer 11, the thickness of which is such that the diameter of the fibre having this first coating is between 135 and 300 $\mu$m, for example 250 $\mu$m, and a second layer 9 made of a crosslinked epoxidized-polydiene oligomer;

in the case of FIG. 3, the two aforementioned layers 11 and 9, as well as a third layer 10 (colorant layer). The diameter of the fibre having the layers 11 and 10 is, for example, 270 $\mu$m.

The layer 9 described above, because of its exceptional adhesion to the lightguide, makes it possible to fill any asperity or microporosity present on the surface of the lightguide and increases the strength of the fibre by more than 30%.

The first layer 11 (the radially innermost layer) is made of a crosslinked material which adheres to the lightguide less strongly than the crosslinked epoxidized-polydiene oligomer adheres to the lightguide and which is chemically compatible with the epoxidized-polydiene oligomer. Such a material is, for example, an epoxy acrylate or a semi-adherent polydiene oligomer. Its surface is sufficiently porous to allow interpenetration with the radially outermost layer 9.

The thickness of the fibre thus obtained, i.e. of the lightguide provided with the coatings 9, 11 and/or 10, is, for example, about 380 $\mu$m, but may be as much as 500 $\mu$m or more. In this case, the optical fibre is extremely robust and can be used as a monofibre cable, without any additionally external sheathing.

As a variant, a group of optical fibres according to the invention is brought together in an external protective sheath in order to form a multifibre cable.

In a manner known per se, this protective sheath may comprise a tubular or approximately tubular element, or the like, consisting of a sheath made of polymer (polyethylene, polypropylene or polybutylene terephthalate) optionally reinforced with glass fibres or with aramid fibres, for example those sold by Du Pont de Nemours under the Kevlar® trademark, and/or an external sheath made of metal (steel or aluminium).

Figure 4:
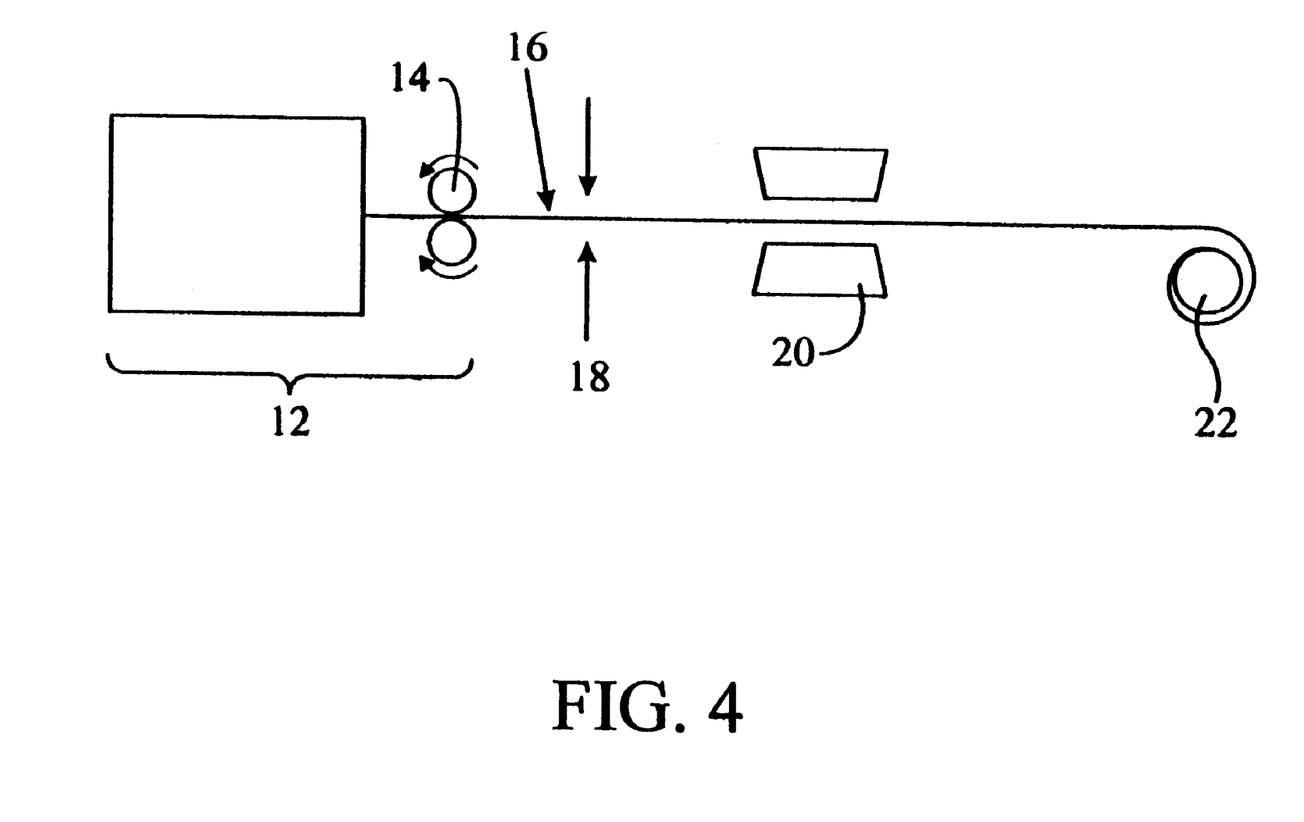
FIG. 4 shows a process for manufacturing a fibre provided with a protective coating comprising a single layer of a crosslinked epoxidized-polydiene oligomer.

FIG. 4 shows a process for manufacturing a flexible fibre, according to the invention, provided with a protective coating comprising a single layer of a crosslinked epoxidized-polydiene oligomer.

The fibre 16, for example a glass fibre, a textile fibre, a metal fibre or other fibre, is obtained from the extrusion device 12 and/or drawing device (rollers 14). Immediately after the fibre has been extruded and/or drawn, a device 18 is used to apply a thin layer, for example 20 to 60 $\mu$m in thickness, of an epoxidized-polydiene oligomer on the fibre which is running at high speed (between 100 and 600 m/min) as will be described in greater detail below. The epoxidized-polydiene oligomer is then crosslinked by the device 20, which is, for example, a UV oven. The fibre provided with its coating is then guided to a spooling device 22 for the purpose of storing it.

Figure 5:
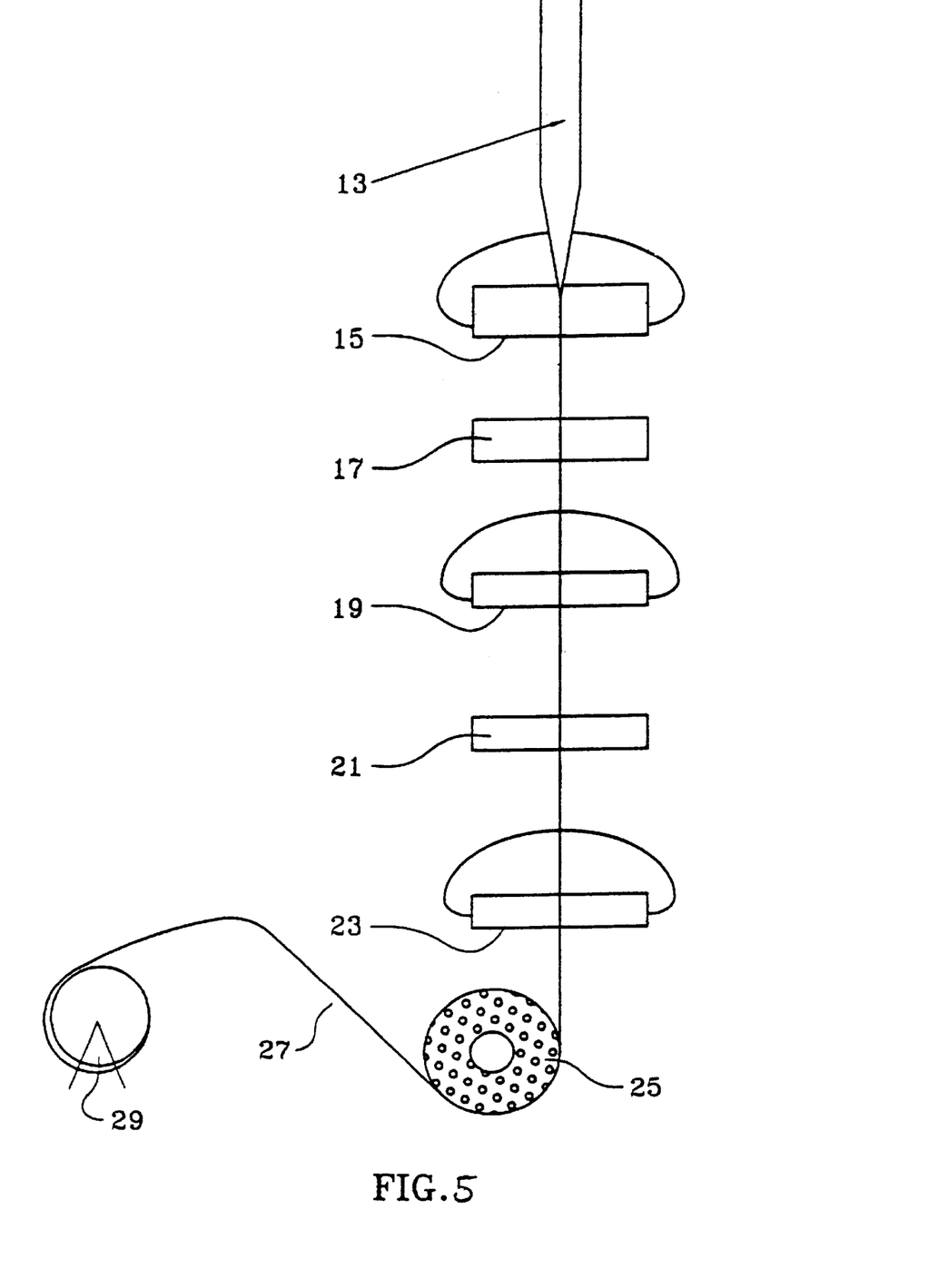
FIG. 5 shows a process for manufacturing the optical fibre according to FIG. 2.

FIG. 5 shows a process for manufacturing an optical fibre according to FIG. 2.

A cylindrical preform 13 is spun in a furnace 15 so as to obtain a lightguide of the desired diameter, for example 125 μm.

Immediately after the lightguide has been drawn, a device 17 is used to apply a thin layer, for example 10 to 100 μm in thickness, of a weakly adherent material allowing the fibre to be stripped, for example a UV-crosslinkable epoxy acrylate. This is because the silica must be bare and clean in order to allow the lightguide to be crimped or adhesively bonded in a connector ferrule.

The device 17 is such that it allows the aforementioned material to be deposited at high speed (lightguide run speed: 100–600 m/min) by a pressure process or a dipping process. The dipping process consists in making the lightguide pass through a die containing the material to be deposited. The pressure process has the advantage of preventing air bubbles forming in the deposited material, since the latter is applied under pressure of an inert gas (typically $N_2$), which is injected through the die.

After the material allowing stripping has been applied to the lightguide, it is crosslinked in a suitable manner. For example, if the material applied is an epoxy acrylate, the fibre is passed through a UV oven 19 having a power of 120 W/cm.

A protective layer of an epoxidized-polydiene oligomer is then applied to the first coating, also by pressure or dipping (device 21), with different additives such as reactive diluents, wetting agents, colorants, photoinitiator salts, etc. This layer is then crosslinked, for example by UV irradiation (UV oven 23).

The optical fibre 27 provided with the two coating layers is then guided to a device 29 for spooling the fibre on a mandrel.

Figures 6A, 6B, 6C:
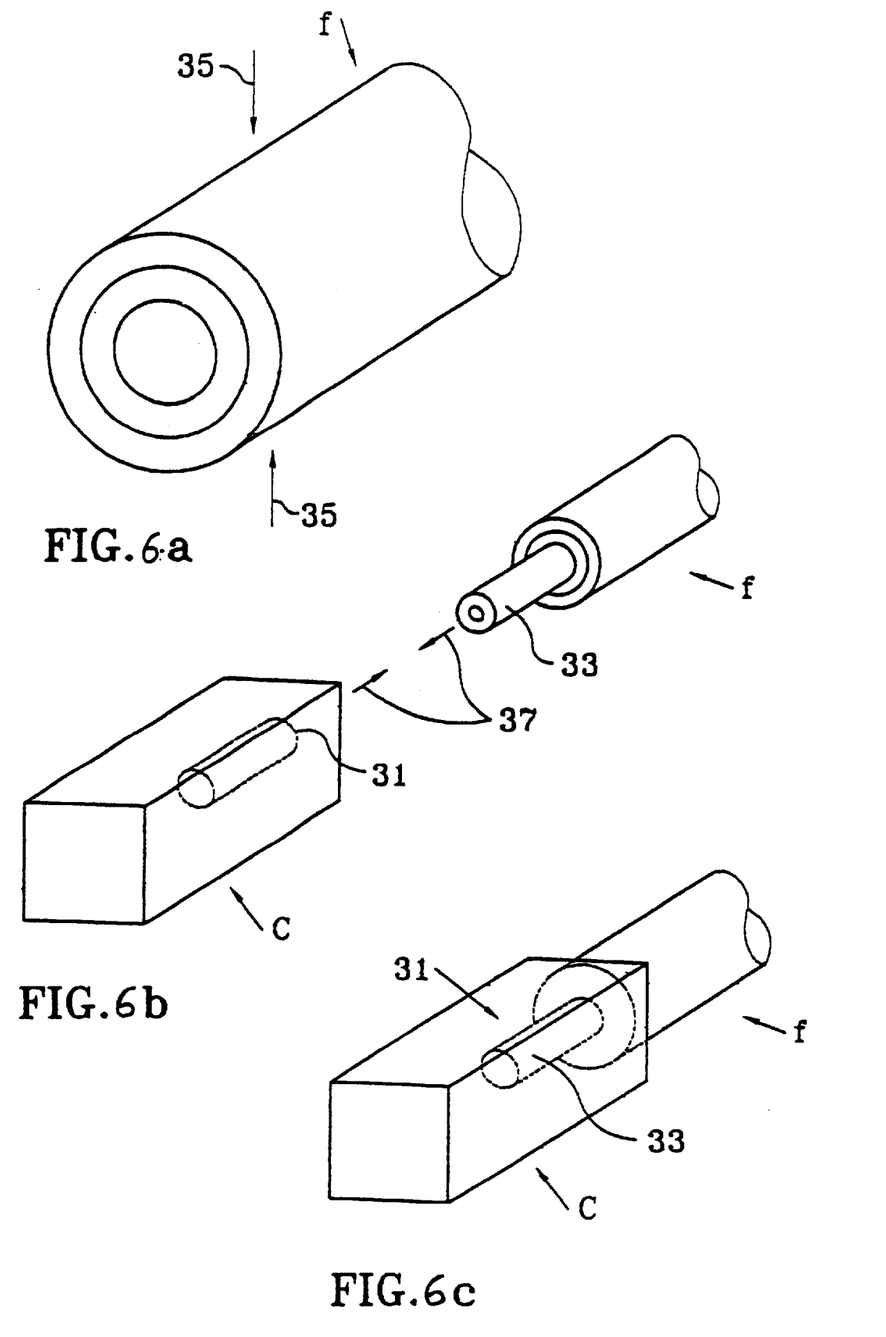
FIGS. 6a to 6c show a process according to the present invention, consisting in fitting the fibre according to FIG. 2 with a standardized connector.

FIGS. 6a to 6c show a process according to the present invention consisting in fitting a fibre f according to the present invention with a standardized connector c having a cylindrical cavity 31 for accommodating the end 33 of the optical fibre.

Although the insertion of an end provided with the sheath does not lie outside the scope of the present invention, the advantageous example illustrated in FIGS. 6a to 6c uses a connector c of the ST type sold, for example, by Amphemol, Amp, Molex or Socapex, the cylindrical cavity 31 of which has an internal diameter approximately equal to the external diameter of the lightguide, for example 125 μm, and the length of which is equal to 3 to 4 mm.

In such a case, the protective coatings 7, 9 and/or 11 are ablated over the desired length of the end of the fibre f.

Advantageously, the ablation is performed mechanically by exerting shear forces shown symbolically by the arrows 35 in FIG. 6a, these forces being applied, for example, using a stripping tool (not shown in the figure) sold, for example, by Siemens.

The mechanical ablation of the end of the coating is facilitated by the presence of a radially internal layer 11 which adheres to the lightguide less strongly than the radially external layer 9 would if it were applied directly to the external surface of the lightguide 1, especially a silica lightguide.

As a variant, the protective coatings 7, 9 and/or 11 are ablated thermally, by pyrolysis, or by selectively etching these coatings, for example by dipping the end of the fibre into a bath of a reagent which etches the coatings without affecting the lightguide.

The axis of the end 33 of the optical fibre f according to the present invention is aligned with the axis of the cavity 31 of the connector c, and then the fibre f is moved towards the connector c along the direction of the arrows 37 (and/or vice versa) (FIG. 6b) until the connection illustrated in FIG. 6c is obtained, in which the end 33 of the fibre f lies in the cavity 31. If necessary, the fibre is then locked, by means of known type, in order to prevent the end 33 from being unintentionally removed from the cavity 31.

As is apparent from the foregoing, the invention is in no way limited to those of its methods of implementation, embodiments and examples of application which have just been explicitly described; on the contrary, it encompasses any variant thereof which may occur to a person skilled in the art, without departing either from the context or the scope of the present invention.

In particular, although no information has been given on the subject of the UV radiation source, it goes without saying that the latter may consist of at least one bar providing UV illumination of suitable power.

What is claimed is:

1. A fiber with a protective coating, the protective coating comprising at least one outer layer of a crosslinked epoxidized-polydiene oligomer and at least one intermediate layer of a crosslinked material that adheres to the fiber less strongly than said crosslinked epoxidized-polydiene oligomer adheres to the fiber and is compatible with said crosslinked epoxidized-polydiene oligomer.

2. The fiber of claim 1, wherein the thickness of said layer of a crosslinked epoxidized-polydiene oligomer is between 20 and 60 μm.

3. The fiber of claim 1, wherein said fiber comprises a silica optical lightguide.

4. The fiber of claim 3, wherein said lightguide is made of silica doped with germanium.

5. The fiber of claim 1, wherein said fiber is a plastic optical lightguide.

6. The fiber of claim 1, wherein said intermediate layer comprises a UV-crosslinked material selected from the group consisting of an epoxy acrylate and a semi-adherent polydiene oligomer.

7. The fiber of claim 1, wherein the thickness of said intermediate layer is between 10 and 100 μm.

8. The fiber of claim 1, wherein said protective coating is provided with a marking produced by a colorant.

9. The fiber of claim 8, wherein said colorant is incorporated into the layer of the crosslinked epoxidized polydiene oligomer.

10. The fiber of claim 8, wherein said marking produced by a colorant comprises a colorant layer internal to said layer of a crosslinked epoxidized-polydiene oligomer.

11. The fiber of claim 10, wherein said colorant layer comprises a colorant incorporated into the intermediate layer.

12. The fiber of claim 10, wherein the thickness of said colorant layer is between 3 and 10 μm.

13. A cable comprising at least one fiber of claim 3, surrounded by a protective sheath.

14. A cable comprising at least two colored optical fibers of claim 8, surrounded by a protective sheath, each optical fiber being colored differently to allow each fiber to be identified at the ends of said cable.

15. The fiber of claim 2, wherein the thickness of said layer of crosslinked epoxidized-polydiene oligomer is between 20 and 40 μm.

16. The fiber of claim 7, wherein the thickness of said intermediate layer is between 20 and 60 μm.

17. The fiber of claim 11, wherein the intermediate layer comprises a crosslinked epoxy acrylate.

18. A lightguide comprising optical fibers provided with a protective coating, the protective coating comprising:
   (a) at least one radially outermost layer of a crosslinked epoxidized-polydiene oligomer,
   (b) at least one radially innermost layer of a crosslinked material that adheres less strongly than said crosslinked epoxidized-polydiene oligomer layer to the fibers and is compatible with said crosslinked epoxidized polydiene oligomer and a colorant layer between the outermost and innermost layers.

19. The lightguide of claim 18, wherein said lightguide comprises a silica optical lightguide.

20. The lightguide of claim 18, wherein said lightguide is made of silica doped with germanium.

21. The lightguide of claim 18, wherein said lightguide is a plastic optical lightguide.

* * * * *